(12) United States Patent
Morrison

(10) Patent No.: US 9,244,176 B2
(45) Date of Patent: Jan. 26, 2016

(54) METHODS AND APPARATUSES FOR ESTIMATING TIME RELATIONSHIP INFORMATION BETWEEN NAVIGATION SYSTEMS

(75) Inventor: William James Morrison, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 699 days.

(21) Appl. No.: 12/612,635

(22) Filed: Nov. 4, 2009

(65) Prior Publication Data

US 2011/0102253 A1 May 5, 2011

(51) Int. Cl.
*G01S 19/33* (2010.01)
*G01S 19/42* (2010.01)

(52) U.S. Cl.
CPC ............... *G01S 19/33* (2013.01); *G01S 19/425* (2013.01)

(58) Field of Classification Search
USPC .................................................. 342/357.73
IPC ........................................... G01S 19/33,19/425
See application file for complete search history.

(56) References Cited

U.S. PATENT DOCUMENTS

| 5,561,836 | A | * | 10/1996 | Sowles et al. | ................. | 455/428 |
| 5,867,411 | A | * | 2/1999 | Kumar | ......................... | 708/300 |
| 5,914,685 | A | * | 6/1999 | Kozlov et al. | ............ | 342/357.73 |
| 5,955,986 | A | * | 9/1999 | Sullivan | .................... | 342/357.68 |
| 6,061,018 | A | * | 5/2000 | Sheynblat | ................ | 342/357.33 |
| 6,266,007 | B1 | | 7/2001 | Lennen | | |
| 7,095,368 | B1 | | 8/2006 | Van Diggelen | | |
| 7,768,449 | B2 | | 8/2010 | Gaal et al. | | |
| 2008/0068263 | A1 | * | 3/2008 | Tekawy et al. | ........... | 342/357.11 |
| 2008/0079633 | A1 | * | 4/2008 | Pon et al. | ................. | 342/357.12 |
| 2008/0088506 | A1 | * | 4/2008 | Fischer | .................... | 342/357.06 |
| 2009/0256745 | A1 | * | 10/2009 | Pon | ......................... | 342/357.12 |
| 2009/0289849 | A1 | * | 11/2009 | Baddini Mantovani | . | 342/357.15 |
| 2010/0039321 | A1 | * | 2/2010 | Abraham | ................. | 342/357.12 |

FOREIGN PATENT DOCUMENTS

| CN | 101449177 A | | 6/2009 | | |
| CN | 101506681 A | | 8/2009 | | |
| GB | 2456150 A | * | 7/2009 | ............... | G01S 5/14 |
| JP | H06265624 A | | 9/1994 | | |
| JP | 2007292610 A | | 11/2007 | | |
| KR | 20080022581 A | | 3/2008 | | |
| WO | 2007082038 A1 | | 7/2007 | | |

OTHER PUBLICATIONS

A. Moudrak et al., GPS Galileo Time Offset: How It Affects Positioning Accuracy and How to Cope with It, Proceedings of the 17th International Technical Meeting of the Satellite Division of the Institute of Navigation, Sep. 21, 2004.*

(Continued)

*Primary Examiner* — Gregory C Issing
*Assistant Examiner* — Fred H Mull
(74) *Attorney, Agent, or Firm* — Bala M. Ramasamy

(57) ABSTRACT

Methods and apparatuses are provided that may be implemented in various electronic devices to possibly reduce a first-time-to-fix and/or otherwise increase the performance or efficiency of a device by employing a position/velocity estimation process using at least one estimated time relationship parameter.

50 Claims, 3 Drawing Sheets

(56) References Cited

OTHER PUBLICATIONS

C. Hegarty et al., GPS + Modernized GPS + Galileo Signal Timing Biases, GPS World, p. 49-54, Mar. 2006.*

R.W. Parkinson et al., Global Positioning System: Theory and Applications, vol. 1; Progress in Astronautics and Aeronatics, vol. 163, American Institute of Aeronautics and Astronautics, Inc., p. 10-11, 1996.*

International Search Report and Written Opinion—PCT/US2010/055304—ISA/EPO—May 11, 2011.

Jorg H Hahn et al: "A Report on GPS and Galileo Time Offset Coordination Efforts", Frequency Control Symposium, 2007 Joint With the 21st European Frequen CY and Time Forum. IEEE International, IEEE, PI, May 1, 2007, pp. 440-445, XP031138002, ISBN: 978-1-4244-0646-3.

Navstar Global Positioning System : "Naystar GPS Space Segment/Navigation User Interfaces", Interface Specification, IS-GPS-200, Revision D, IS-GPS-200D, U.S., Arinc Engineering Services, LLC, Dec. 7, 2004, pp. 1-192.

Taiwan Search Report—TW099137977—TIPO—Jul. 31, 2013.

\* cited by examiner

METHODS AND APPARATUSES FOR ESTIMATING TIME RELATIONSHIP INFORMATION BETWEEN NAVIGATION SYSTEMS

BACKGROUND

1. Field

The subject matter disclosed herein relates to electronic devices, and more particularly to methods and apparatuses for use in and/or with a device capable of receiving satellite positioning system (SPS) signals from a plurality of navigation systems.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information.

Another popular and increasingly important wireless technology includes navigation systems and in particular those that are enabled for use with a satellite positioning system (SPS) that includes, for example, the global positioning system (GPS) and/or other like Global Navigation Satellite Systems (GNSSs). SPS enabled devices, for example, may receive wireless SPS signals that are transmitted by orbiting satellites of a GNSS and/or other terrestrial based transmitting devices. Received SPS signals may, for example, be processed to determine a corresponding GNSS system time, a range or pseudorange, an approximate or accurate geographical location, altitude, and/or velocity of the SPS enabled device. Consequently, various position and/or velocity estimation processes may be provided, at least in part, using an SPS enabled device.

Certain devices may be enabled to receive and process SPS signals transmitted by two or more GNSS or other like navigation systems. For example, certain devices may include one or more SPS receivers capable of receiving SPS signals from GPS and one or more other GNSS, such as, e.g., Galileo or GLONASS, or from Galileo and GLONASS, or other like combinations. Each GNSS has a specific corresponding 'system time' based on its particular clock. As there may be differences between such system times it may be difficult to use a mixture of different GNSS signals for position and/or velocity estimation processes at certain times. Accordingly, for this reason and/or others it may be useful to employ techniques that allow for a mixture of different GNSS signals to be used for position and/or velocity estimation processes in certain situations.

SUMMARY

In accordance with certain aspects, techniques are provided which may be implemented through various methods and apparatuses in a device having a satellite positioning system (SPS) receiver to improve performance of a navigation service and/or other like process in certain situations. Here, for example, certain techniques may be implemented to reduce a first-time-to-fix and/or otherwise increase the performance or efficiency of a device in determining at least its current estimated position based, at least in part, on at least one estimated time relationship parameter. Such techniques may, for example, reduce the period of time spent determining system time(s) by enabling a device to estimate or otherwise determine in some manner information regarding time relationships between the device and one or more navigation systems.

In certain example implementations, a method may be implemented in a device enabled to receive and process SPS signals associated with at least first and second navigation systems. The method may include generating an estimated time bias (TB) parameter associated with the device, the first navigation system, and the second navigation system, and selectively generating a pseudorange (PR) measurement corresponding to the device and at least one space vehicle (SV) of either the first or second navigation systems based, at least in part, on the estimated TB parameter. The method may also include generating an estimated position of the device based, at least in part, on the PR.

In certain example implementations, the first navigation system may be operatively associated with a first system time and the second navigation system may be operatively associated with a second system time that is offset from the first system time by a dynamically changing offset value. Here, for example, a method may further include generating the estimated TB parameter based, at least in part, on a time offset (TO) parameter associated with the dynamically changing offset value. In certain further example implementations, a method may include generating the estimated TB parameter further based, at least in part, on a differential group delay (GD) parameter associated with the device. Here, for example, a differential GD parameter may be predetermined.

In other example implementations, a method may include generating the differential GD parameter based, at least in part, on at least one of a temperature parameter and/or a previously stored TB parameter. In still other example implementations, a method may include receiving a TO parameter, and/or generating a TO parameter based, at least in part, on a previously stored TB parameter and/or a differential GD parameter.

In certain example implementations, a method may include verifying that an estimated TB parameter may be acceptable for use based, at least in part, on at least one uncertainty measurement associated with the estimated TB parameter.

In certain example implementations, a method may include obtaining a first plurality of SPS signals associated with the first navigation system, wherein a first total number of available SPS signals associated with the first navigation system does not satisfy a minimum number of SPS signals to compute the estimated position of the device, and obtaining at least one SPS signal associated with the second navigation system, wherein a second total number of available SPS signals associated with the second navigation system also does not satisfy the minimum number of SPS signals to compute the estimated position of the device. Here, however, given the method, the first and second total number of available SPS signals when summed together may satisfy the minimum number of SPS signals to compute the estimated position of the device. By way of example, in certain implementations, a minimum number of SPS signals to compute the estimated position of the device may be three or four provided that an altitude parameter is available, or four or five otherwise.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
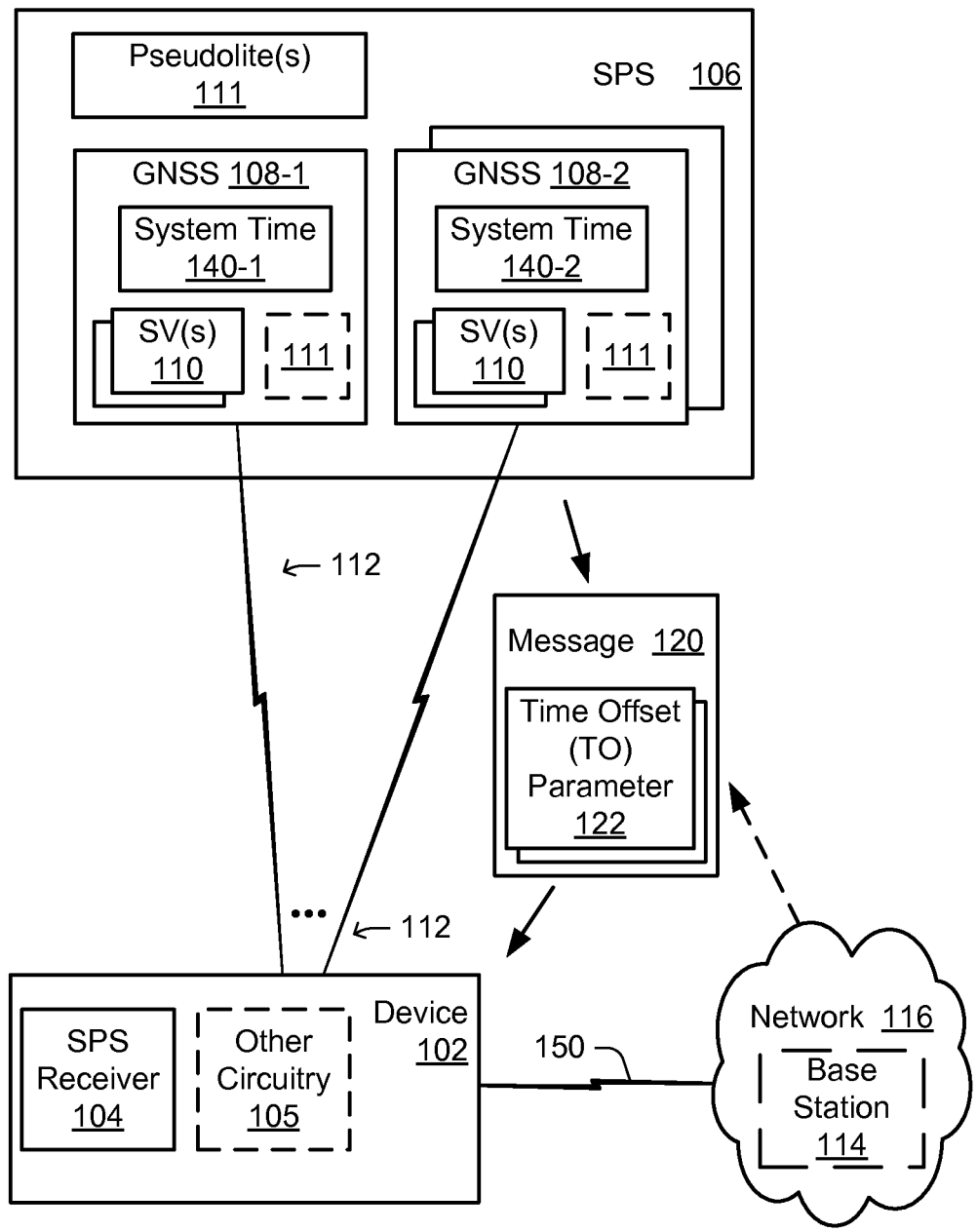
FIG. 1 is a schematic block diagram illustrating an exemplary signaling environment that includes at least one device capable of supporting, at least in part, one or more position and/or velocity (e.g., position/velocity) estimation processes based, at least in part, on at least one estimated time relationship parameter, in accordance with an implementation.

In accordance with certain example implementations, a device having a satellite positioning system (SPS) receiver may benefit by implementing a method to improve performance of a navigation service and/or other like process in certain situations. Here, for example, certain techniques may be implemented to reduce a first-time-to-fix and/or otherwise increase the performance or efficiency of a device in determining its current estimated position/velocity based, at least in part, on at least one estimated time relationship parameter. Such techniques may, for example, reduce the period of time spent determining system time(s) by enabling a device to estimate or otherwise determine in some manner information regarding time relationships between the device and one or more navigation systems.

By way of example, in accordance with certain aspects a device that is enabled to receive and process SPS signals associated with at least first and second navigation systems may implement a method in which an estimated time bias (TB) parameter is accessed and/or otherwise determined. The estimated TB parameter may be associated with the device, the first navigation system, and the second navigation system. For example, an estimated TB parameter may account for a time offset (TO) parameter associated with a dynamically changing offset value between a first system time of the first navigation system and a second system time of the second navigation system. Such estimated TB parameter may also account for a differential group delay (GD) parameter associated with the device.

The method may also include selectively determining pseudorange (PR) measurements corresponding to the device and at least one space vehicle (SV) of either the first or second navigation systems based, at least in part, on an estimated TB parameter. The method may also include determining an estimated position and/or an estimated velocity of the device based, at least in part, on such PR measurements.

As described in greater detail below, in certain instances a TO parameter may be transmitted or otherwise provided by an SV or other device.

In certain other instances a TO parameter may be determined, for example, based, at least in part, on a previously stored TB parameter and/or a differential GD parameter. In certain instances, for example, a differential GD parameter may be predetermined or determined based, at least in part, on a temperature parameter and/or a previously stored TB parameter.

In certain example implementations, a method may include verifying that an estimated TB parameter is acceptable for use. For example, such verification may be based, at least in part, on at least one uncertainty measurement associated with an estimated TB parameter and/or other parameter that may have been used to determine such. Here, for example, an uncertainty measurement may be related to an 'age' and/or other like factor associated with information used to determine an estimated TB parameter.

In certain example implementations, a method may be implemented to selectively determine PR measurements, and/or estimate position/velocity based on the number of available SPS signals and corresponding sources. Thus, for example, while a device may obtain a first plurality of SPS signals associated with the first navigation system, a first total number of available SPS signals associated with the first navigation system may fail to satisfy a minimum threshold number of SPS signals needed to compute an estimated position/velocity. However, such a device may also obtain at least one SPS signal associated with the second navigation system. Here, however, a second total number of available SPS signals associated with the second navigation system may also fail to satisfy a minimum threshold number of SPS signals to compute an estimated position/velocity. In certain instances the first and second total number of available SPS signals when summed together may satisfy a minimum threshold number of SPS signals. In certain instances, a velocity solution computed with a mixture of different navigation system related PRR measurements may not require a TB parameter or modeling of any inter GNSS bias unknown.

Accordingly, in certain example instances, the techniques provided herein may expedite a time-to-first fix by allowing an estimated TB parameter or other like time relationship parameter to be estimated or otherwise determined such that some PR for SVs in the first navigation system and at least one PR measurement for an SV in at least the second navigation system may be used to estimate a position of the device.

By way of example, a minimum threshold number of SPS signals to compute an estimated position/velocity of a device may be three, provided that an altitude parameter or other like altitude assumption is available. Otherwise, for example, a minimum threshold number of SPS signals to compute an estimated position/velocity of the device may be four. Thus, for example, if such threshold specifies that at least three SPS signals are needed, then two of the three SPS signals may be associated with a first navigation system and the remaining SPS signal may be associated with a second navigation system. If such threshold specifies that at least four SPS signals are needed, for example, then two or three of the SPS signals may be associated with a first navigation system and one or two SPS signal may be associated with a second navigation system. The minimum threshold number of SPS signals to compute such a mixed GNSS solution in this example assumes that a TB parameter is available for use as a constraint in the solution (e.g., similar to altitude in terms of implementation). If such a constraint is not available, then a minimum number of SPS signals for such a mixed GNSS the solution may be increased by one (e.g., four with altitude parameter, five otherwise).

By way of example but not limitation, some example methods and apparatuses described herein may be implemented as part of, and/or to operatively support, various positioning processes (e.g., navigation services) associated with a plurality of GNSS and/or other like navigation systems, and/or combination thereof. Such positioning processes may, for example, be performed by a device operating in a 'standalone' mode. In other examples, such positioning processes may be performed by a device operating in an 'assisted' mode with help from one or more other devices. For example, in certain example implementations, a device may take the form of a mobile station (MS) which may or may not receive assistance from one or more other devices.

Also as described in greater detail in subsequent sections, as used herein an SPS may include a variety of like or different types of systems, devices, processes, etc., that are capable of providing and/or otherwise supporting in some manner a position/velocity estimation process. By way of example but not limitation, in certain example implementations an SPS may include one or more GNSS such as the global positioning system (GPS), GLONASS, Galileo, etc., each having a plurality of corresponding SVs, and/or one or more terrestrial based networks/devices such as pseudolites, which transmit SPS signals that may be acquired by an SPS enabled device.

As used herein, a position/velocity estimation process may include any process in which a device may be involved, that in some manner is based, at least in part, on SPS related information associated with at least one SPS signal acquired by an SPS receiver in the device and/or a SPS receiver coupled to but external to the device. In certain example implementations, a position/velocity estimation process may include a position/navigation capability that is provided by a device based on locally maintained measurement information. In certain other example implementations, a position/velocity estimation process may include a position/navigation capability that is provided in part by one or more other devices with assistance from a host device based, at least in part, on SPS related information that is communicated between the host device and the one or more other devices.

Reference is now made to FIG. 1, which is a schematic block diagram illustrating an exemplary signaling environment 100 that includes at least one device 102 capable of supporting, at least in part, one or more position/velocity estimation processes based, at least in part, on one or more transmitted and received SPS signals 112 which, as illustrated here, may include a message 120 comprising a time offset (TO) parameter 122, in accordance with an example implementation.

Environment 100 may include various computing and communication resources capable of providing at least some form of a position/velocity estimation process with regard to device 102 based, at least in part, on one or more SPS signals 112 from an SPS 106. Device 102 is representative, therefore, of an electronic device that is capable of performing with or without assistance a position/velocity estimation process based at least in part on SPS signals. Accordingly, device 102 may include or otherwise be operatively coupled to at least one SPS receiver 104. Thus, for example, device 102 may take the form of a stand-alone navigation circuit or device in certain implementations.

In other implementations, as illustrated in the example shown in FIG. 1, device 102 may include other circuitry 105 and/or the like which enables device 102 to perform and/or support other processes. By way of example but not limitation, device 102 may take the form of a mobile or portable computing device or machine that may also be capable of communicating with one or more resources within a wireless/wired communication network 116 over one or more wireless communication links 150 coupled to a base station 114 or other like access point, and/or other system which may transmit a TO parameter 122 and/or other like navigation system and/or SPS time relationship information.

Device 102 may include a mobile station (MS) such as a cellular phone, a smart phone, a personal digital assistant, a portable computing device, a navigation unit, and/or the like or any combination thereof, for example. In other example implementations, device 102 may take the form of one or more integrated circuits, circuit boards, and/or the like that may be operatively enabled for use in another device.

Device 102 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

As illustrated in the example in FIG. 1, SPS 106 may, for example, include one or more GNSS 108 or other like navigation systems, shown here are (first) GNSS 108-1 and (second) GNSS 108-2, each of which may include a different plurality of SVs 110 that may transmit different SPS signals 112. As illustrated, some SPS signals may include message 120 (e.g., a navigation message) comprising a TO parameter 122. As illustrated, SPS 106 may, for example, include one or more pseudolites 111 and/or other like transmitting devices that may transmit certain SPS signals 112. Also, as shown, in certain implementations, a message 120 and/or the like that provides a TO parameter 122 may be transmitted or otherwise provided to device 102 via a network 116 from one or more other devices/resources coupled thereto.

As mentioned, the techniques described herein may be used with an SPS that includes various navigation systems such as GNSS and/or combinations of GNSS, or other regional/local navigation systems, for example. Furthermore, such techniques may be used with navigation systems that utilize pseudolites or a combination of space vehicles (SVs) and pseudolites. Pseudolites 111 may, for example, include ground-based transmitters that broadcast a PN code or other ranging code (e.g., similar to a GPS or CDMA cellular signal). Such a transmitter may be assigned a unique PN code so as to permit identification by a remote receiver. Pseudolites may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals", as used herein, is intended to include SPS signals from pseudolites or equivalents of pseudolites.

Some exemplary methods and apparatuses will now be described, which may be implemented in whole or part in one or more devices, such as device 102, that process SPS signals. By way of example, one or more devices 102 may include dedicated and/or special-purpose programmed circuitry capable of identifying at least an estimated TB parameter that is based, at least in part, on a TO parameter.

Figure 2:
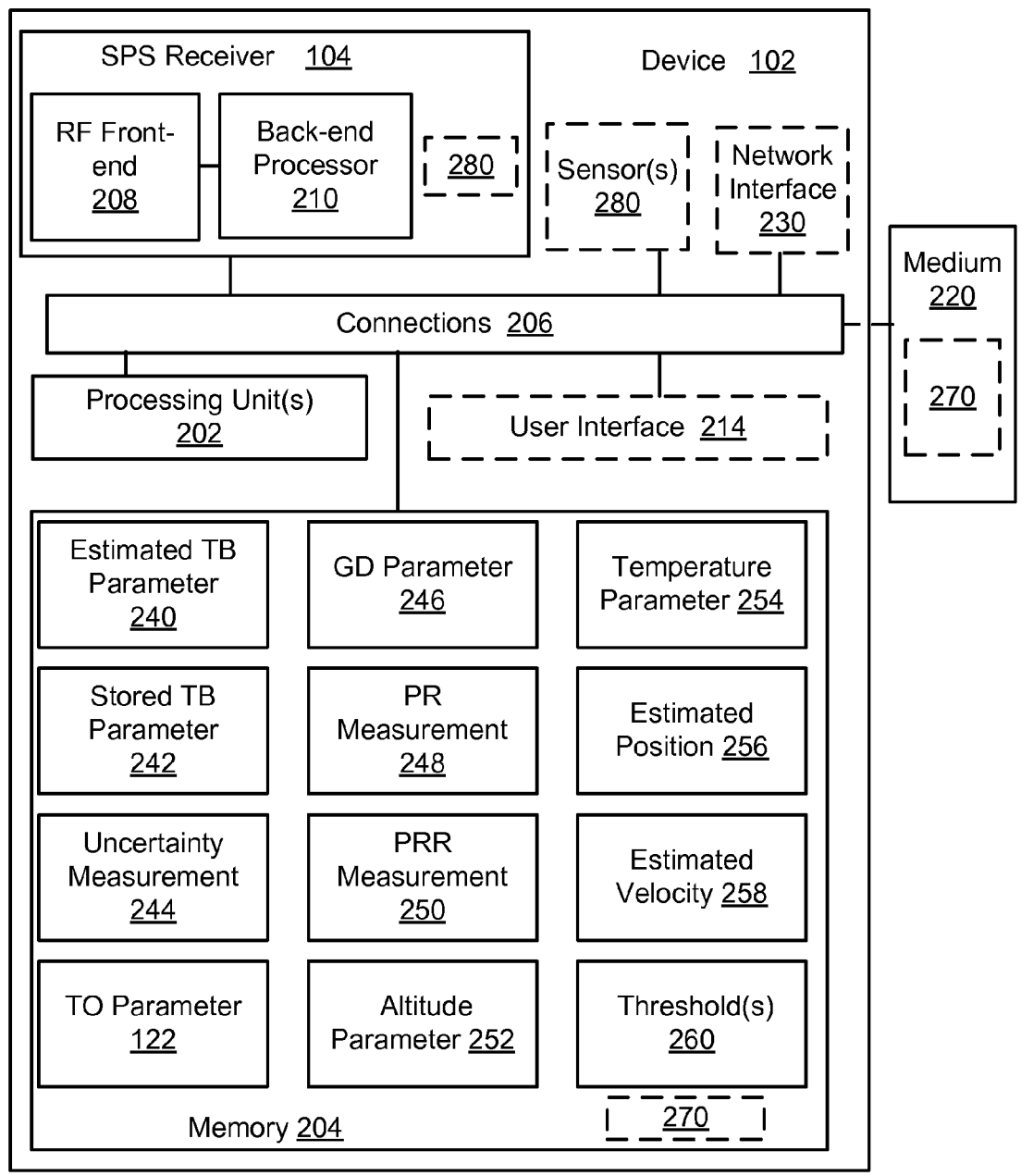
FIG. 2 is a schematic block diagram illustrating certain features of an exemplary device, for example as in FIG. 1, capable of employing a position/velocity estimation process using at least one estimated time relationship parameter, in accordance with an implementation.

As illustrated in the exemplary schematic block diagram of FIG. 2, in certain implementations device 102 may include an SPS receiver 104 capable of receiving an RF signal that includes at least one SPS signal 112. SPS receiver 104 may include, for example, an RF front-end circuit 208 coupled to a back-end processor (processing unit) 210. RF front-end circuit 208 may, for example, generate one or more electronic signals representing one or more GNSS or other like navigation system signals. In certain implementations, back-end processor 210 may use the one or more electronic signals from RF front-end circuit 208 to establish information, such as, for example, all or portions of the information stored in memory 204.

Various forms/types of information may be stored in memory 204. By way of example but not limitation, as illustrated in FIG. 2, memory 204 may store one or more estimated TB parameters 240 and possibly one or more corresponding uncertainty measurements 244, one or more previously stored TB parameters 242, one or more TO parameters 122, one or more GD parameters 246, one or more PR measurements 248, one or more PRR measurements 250, an altitude parameter 252, one or more temperature parameters 254, one or more estimated positions 256, one or more estimated velocity 258, one or more thresholds (e.g., minimum number of SPS signals) 260, and/or any combination thereof or the like. Memory 204 may have stored therein various other data and computer implementable instructions 270. Such instructions may be executed, for example, by one or more processing units or processors 202/210.

In certain example implementations, SPS receiver 104 and/or processing unit(s) 202/210 may be enabled to exchange one or more electronic signals representing at least a portion of the information, etc., stored in memory 204, for example, via one or more connections 206.

As mentioned, in certain example implementations, one or more of the circuits illustrated within device 102 may be operatively responsive to, or otherwise affected in some manner by, computer implementable instructions 270, which may be stored in memory 204. Thus, for example, at least a portion of the computer implementable instructions 270 may be implemented by processing unit(s) 202/210, back-end processor 210, communication network interface 230, etc., to provide or otherwise operatively support in some manner the techniques described herein. It should be recognized that in certain implementations, one or more of processing unit(s) 202/210 and back-end processor 210 may comprise the same or some common circuitry.

As illustrated in FIG. 2 an article of manufacture represented here by a computer readable medium 220 may be provided and accessed by processing unit(s) 202/210, for example. As such, in certain example implementations, the methods and/or apparatuses may take the form in whole or part of a computer readable medium 220 that includes computer implementable instructions 270 stored thereon, which if executed by at least one processing unit or other like circuitry are enabled to enable the processing unit(s) 202/210 and/or the other like circuitry to perform all or portions of the techniques/processes as presented in the examples herein. Computer readable medium 220 may be representative of any data storage mechanism.

Processing unit(s) 202/210 may be implemented in hardware or a combination of hardware and software. Processing unit(s) 202/210 may be representative of one or more circuits configurable to perform at least a portion of a data computing procedure or process. By way of example but not limitation, processing unit(s) 202/210 may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory and/or a secondary memory. Primary memory may include, for example, a random access memory, read only memory, etc. While illustrated in this example as being separate from processing unit(s) 202/210, it should be understood that at least a portion of a primary memory may be provided within or otherwise co-located/coupled with processing unit(s) 202/210, SPS receiver 104, back-end processor 210, etc. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220.

As further illustrated in FIG. 2, device 102 may include one or more connections 206 (e.g., buses, lines, conductors, fibers, etc.) to operatively couple the various circuits together and carry one or more electronic signals there between, and a user interface 214 (e.g., display, touch screen, keypad, buttons, knobs, microphone, speaker, etc.) to receive user input and/or provide information to the user. Device 102 may include a communication network interface 230 (e.g., wireless transceiver, modem, antenna, etc.) to allow for communication with one or more other devices over a communication link (e.g., link 150 in FIG. 1).

As further illustrated in FIG. 2, device 102 may include one or more sensors 280. For example, sensors 280 may comprise an altitude sensor or other like sensor/function to establish or help establish altitude parameter 252. Here, for example, in certain instances with altitude parameter 252 available, position/velocity may be estimated with a reduced threshold number of available SPS signals. For example, sensors 280 may comprise a temperature sensor or other like sensor/function to establish or help establish temperature parameter 254. Temperature parameter 254 may, for example, represent a measured and/or estimated temperature of one or more circuits of device 102 and/or environment/structure associated therewith. Here, for example, in certain instances with temperature parameter 254 available, GD parameter 246 may be more accurately determined. As further illustrated in FIG. 2, in certain example implementations, SPS receiver 104 may include one or more sensors 280. A sensor 280 may, for example, be implemented as a separate circuit or integrated with other circuits.

Figure 3:
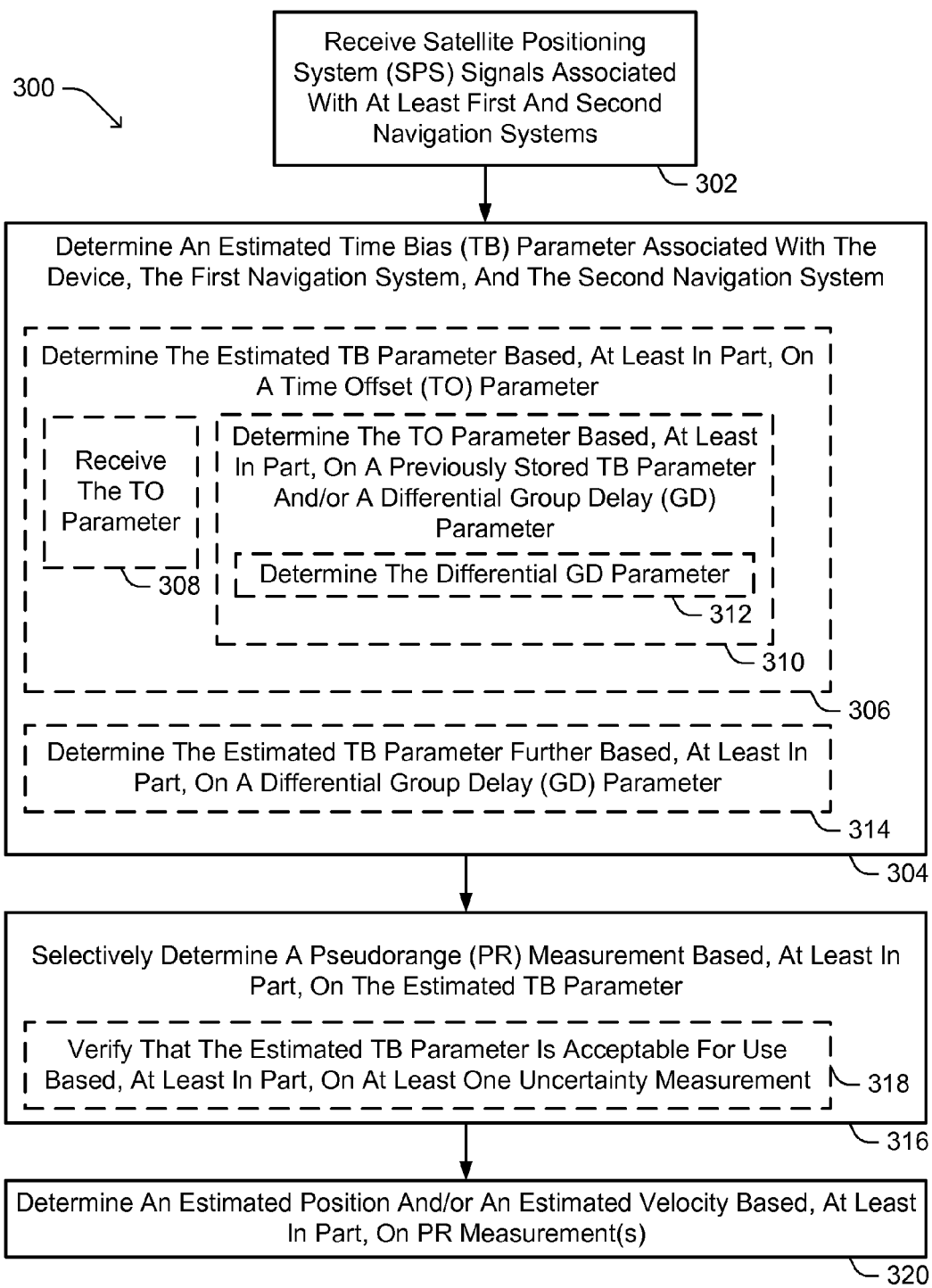
FIG. 3 is a flow diagram illustrating an example process that may be implemented in whole or part in a device, for example as in FIG. 2, to perform a position/velocity estimation process using at least one estimated time relationship parameter, in accordance with an implementation.

Reference is made next to FIG. 3, which is a flow diagram illustrating an example process 300 that may be implemented in whole or part in a device, for example as in FIG. 2, and which may reduce a time-to-first fix, improve yield, and/or otherwise possibly improve performance of such a device, in accordance with an implementation.

At block 302, one or more electronic signals representing all or portions of SPS signals may be received and/or otherwise obtained. Such SPS signals may be associated with a plurality of navigation systems, including at least first and second navigation systems. One or more of the plurality of navigation systems may include a GNSS, for example.

At block 304, an estimated TB parameter may be determined and/or otherwise obtained. Here, for example, the estimated TB parameter may be operatively associated with a timing relationship between the device, the first navigation system, and the second navigation system, and/or portions thereof. In certain example implementations, at block 306, an estimated TB parameter may be determined based, at least in part, on a TO parameter. For example, at block 308, a TO parameter may be received from an SV and/or otherwise obtained from or through one or more other devices and/or networks coupled to the device. By way of example, a TO parameter may be transmitted by a GNSS as part of a navigation or other like message. By way of example, a TO parameter may be received via a network through a network interface as part of a navigation assistance or other like message and/or process.

In certain implementations, a TB parameter may be modeled as an unknown and computed directly in a position solution that uses PR measurements from multiple GNSS. Such newly computed value of TB may be used with an existing value of GD to determine a new value for TO and/or with an existing value of TO to determine a new value for GD. Further, a new value of TB may be saved directly (e.g., with uncertainty) for later use as a constraint in the solution.

In certain example implementations, at block 310, a TO parameter may be determined based, at least in part, on a previously stored TB parameter and/or a differential GD parameter. For example, in certain implementations a TO parameter may be determined by subtracting a differential GD parameter from a previously stored TB parameter. A previously stored TB parameter may, for example, comprise an estimated TB parameter as previously determined by an earlier successful operation of method 300. In certain example implementations, a previously stored TB parameter may comprise a TB parameter as previously determined using one or more other techniques. For example, a previously stored TB parameter may be determined based on previous position fixes that were conducted using the first and second navigation systems independently. In order for the position fix to compute the TB parameter, for example, PR measurements from both GNSS may be used in the solution. In such example implementations, a TB parameter may be modeled as an unknown in the solution (e.g., in addition to the unknowns of a single GNSS solution).

At block 312, for example, in certain implementations a differential GD parameter may be determined. Here, for example, a differential GD parameter may be determined based, at least in part, on at least one of a temperature parameter. Thus, for example, such differential GD parameter may take into account signal processing times that may vary based on a measured, estimated, and/or otherwise obtained temperature or temperatures associated with a device (e.g., temperature of certain circuitry, structure, environment, and/or the like). In certain example implementations, a look-up table, computer implementable model, and/or other like function may be provided to support such determination. In certain instances, an age of one or more circuit components and/or a device may be taken into consideration.

In certain implementations, a previously stored TB parameter may be used to determine a differential GD parameter. For example, a differential GD parameter may be determined by subtracting a TO parameter from a previously stored TB parameter.

At block 314, an estimated TB parameter may be determined based, at least in part, on a differential GD parameter. For example, in certain implementations an estimated TB parameter may be determined by summing together a TO parameter and a differential GD parameter.

At block 316, a PR measurement may be determined. For example, a PR measurement may be determined based, at least in part, on an estimated TB parameter as determined at block 304. For example, an estimated TB parameter may be used when determining or otherwise estimating a propagation time for an SPS signal from transmission to reception.

In certain example implementations, a PR measurement may be selectively determined using an estimated TB parameter based on whether the estimated TB parameter passes a "verification" test. For example, at block 318, an estimated TB parameter may be verified as being acceptable for use based, at least in part, on at least one uncertainty measurement. By way of example, an uncertainty measurement used in a "verification" test may comprise a timestamp and/or other like information that may serve to identify an 'age' of a corresponding estimated TB parameter. If, at block 318, an estimated TB parameter is not verified (fails the verification test), then method 300 may end or restart, for example. If, at block 318, an estimated TB parameter is verified (passes the verification test), then method 300 may continue at blocks 318 and 320, for example.

At block 320, an estimated position and/or an estimated velocity may be determined. For example, an estimated position and/or an estimated velocity may be determined based, at least in part, on at least one PR measurement as determined at block 316.

Those skilled in the art will recognize that such operative substitutions and/or applicable conversions may take on various forms depending on the specific systems and information involved.

With this in mind, a non-limiting example situation will now be presented to further illustrate some of the potential uses and/or benefits of the techniques described herein. The examples below are directed towards determining a position solution for a device that is enabled to receive and process SPS signals associated with two example GNSS, namely GPS and GLONASS.

A GPS or GLONASS receiver may estimate a position given measurements of the transmitter-to-receiver signal transmission time. Because a local SPS receiver clock may not be synchronized with a GNSS' system clock, it may not be possible to measure this transmission time directly. For example, a resulting measurement may differ from actual transmission time by an amount equal to a local clock error. Therefore an SPS receiver may construct a pseudo-measurement of a transmitter-to-receiver range or 'pseudorange' (PR) measurement. Hence, a GPS PR measurement is offset from a measured range by the local clock error with respect to the GPS clock (e.g., GPS system time). Likewise, a GLONASS pseudo-range measurement is offset from a measured range by the local clock error with respect to the GLONASS clock (e.g., GLONASS system time).

Consequently, an SPS receiver that uses both GPS and GLONASS PR measurements to estimate position/velocity may benefit from determining the local offset between the two GNSS system clocks. The sub-second offset between the GPS and GLONASS system clocks, e.g., a GPS to GLONASS Time Offset (GGTO), tends to have a dynamic range of about +/−2.0 milliseconds. GGTO tends to change over time as it represents an offset between two atomic or other like clocks. GGTO will typically be more stable over time than GD as GGTO will likely related to the offset between two atomic clocks. An SPS receiver tends to introduce an additional offset between the GPS and GLONASS system clocks. Here, for example, differential GD may be caused by the difference between RF paths that are provided for the different SPS signals as received from GPS and GLONASS. Such differential GD parameter tends to change as a function of temperature. For example, a magnitude of a differential GD parameter may be less than about 1.0 micro-second.

As such, an SPS receiver that uses both GPS and GLONASS PR (or PRR) measurements, for example, may benefit by accounting for the combined effects of GGTO and differential GD. Thus, in certain example implementations, this locally observed offset between the GPS and GLONASS system clocks is the sum of GGTO and differential GD, and may be referred to as a time bias (TB), which in the examples below is a GPS to GLONASS Time Bias (GGTB).

Hence, a position/velocity solution that includes both GPS and GLONASS PR measurements may use one additional measurement compared to the solution with measurements from a single GNSS due to the additional unknown parameter GGTB.

Techniques presented herein may be implemented, for example, to provide an estimated TB parameter which may improve time-to-fix and yield in an SPS receiver and/or like device. For example, techniques presented herein may provide for maintenance and usage of GGTB, GD, and GGTO parameters. These three parameters may, in certain examples, be determined and/or other learned from independent sources. In certain implementations, an SPS receiver in attempting to compute position may consider the uncertainties of parameters in determining an estimated TB parameter (here, an estimated GGTB parameter).

Usage of an estimated GGTB parameter as a constraint parameter may, for example, enable a position solution in cases that one is otherwise difficult if not impossible. By way of example, a position solution may be determined given an availability of the earth's surface as a constraint or an altitude parameter in the solution and three PR measurements, of which at least one of the PR measurements is GPS based and at least one is GLONASS based. A position solution may be determined given four PR measurements of which at least one of the measurements is GPS based and at least one is GLONASS based, without the availability of the earth's surface as a constraint and/or an altitude parameter. Additionally, in certain example implementations, a GGTB parameter may be used to improve accuracy when a combined GPS and GLONASS solution is otherwise possible.

Some example techniques for determining the three parameters GGTB, GD, and GGTO are described below. Here, for example, one or more of such parameters may be time-stamped and stored, such that an uncertainty of a parameter may be modeled or otherwise determined in some manner as a function of its age. In certain implementations, an average or other like value of GD specific to a GNSS receiver may be determined a-priori. Such a-priori GD estimate may, for example, be used to determine GGTB directly; however its error may vary as a function of temperature. The uncertainty of an a-priori GD may be a fixed value. A GD parameter may be estimated through a temperature look-up table and/or though the use of a like function, which may also be determined a-priori. A GGTO parameter may be provided directly in the navigation message of GLONASS M satellites, for example. An estimated GGTB parameter may, for example, be determined directly by the position solution or based, at least in part, using a GGTO parameter and a GD parameter. A previously stored GGTB parameter or an estimated GGTB parameter may be combined with a GD parameter to determine a GGTO parameter. Similarly, a previously stored GGTB parameter or an estimated GGTB parameter may be combined with a GGTO parameter to determine a GD parameter.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method, comprising:
   with a device configured to receive and process satellite positioning system (SPS) signals associated with at least first and second navigation systems:
      generating one or more electronic signals representing an estimated time bias (TB) parameter based, at least in part, on a differential group delay (GD) parameter associated with said device and a time offset (TO) parameter associated with said first navigation system and said second navigation system, wherein one or more electronic signals representing said TO parameter are generated based, at least in part, on said differential GD parameter; and
      selectively generating one or more electronic signals representing a pseudorange (PR) measurement corresponding to said device and at least one space vehicle (SV) of either said first or second navigation systems based, at least in part, on said estimated TB parameter.

2. The method as recited in claim 1, wherein said first navigation system is operatively associated with a first system time and said second navigation system is operatively associated with a second system time that is offset from said first system time by a dynamically changing offset value, wherein said TO parameter is associated with said dynamically changing offset value.

3. The method as recited in claim 2, further comprising, with said device:
   receiving one or more electronic signals representing said TO parameter.

4. The method as recited in claim 1, wherein said differential GD parameter is predetermined.

5. The method as recited in claim 1, further comprising, with said device:
   generating one or more electronic signals representing said differential GD parameter based, at least in part, on at least one of a temperature parameter or a previously stored TB parameter.

6. The method as recited in claim 1, wherein the selectively generating said one or more electronic signals representing said PR measurement further comprises:
   verifying that said estimated TB parameter is acceptable for use based, at least in part, on at least one uncertainty measurement associated with said estimated TB parameter.

7. The method as recited in claim 1, further comprising, with said device:
   obtaining one or more electronic signals representing a first plurality of SPS signals associated with said first navigation system, wherein a first total number of available SPS signals associated with said first navigation system does not satisfy a minimum number of SPS signals to compute an estimated position of said device; and
   obtaining one or more electronic signals representing at least one SPS signal associated with said second navigation system, and wherein a second total number of available SPS signals associated with said second navigation system also does not satisfy said minimum number of SPS signals to compute said estimated position of said device, but wherein said first and second total number of available SPS signals summed together does satisfy said minimum number of SPS signals to compute said estimated position of said device.

8. The method as recited in claim 7, wherein said minimum number of SPS signals to compute said estimated position of said device is three provided that an altitude parameter is available, or four otherwise.

9. The method as recited in claim 7, wherein said minimum number of SPS signals to compute said estimated position of said device is four provided that an altitude parameter is available, or five otherwise.

10. The method as recited in claim 1, wherein at least one of said first or second navigation systems comprises a Global Navigation Satellite System (GNSS).

11. The method of claim 1, wherein the one or more electronic signals representing said TO parameter are generated by subtracting said differential GD parameter from a previously stored TB parameter.

12. The method of claim 11, wherein said previously stored TB parameter is determined based on a previous position fix that was conducted using said first navigation system and said second navigation system independently.

13. The method of claim 1, further comprising generating one or more electronic signals for input to a positioning calculation, wherein said one or more electronic signals are based, at least in part, on said PR measurement.

14. The method of claim 1, further comprising generating one or more electronic signals to enable said device to determine an estimated position of said device, wherein said one or more electronic signals are based, at least in part, on:
   said PR measurement; and
   at least three additional stored PR measurements.

15. An apparatus, comprising:
   means for receiving satellite positioning system (SPS) signals associated with at least first and second navigation systems;
   means for determining an estimated time bias (TB) parameter based, at least in part, on a differential group delay (GD) parameter associated with said apparatus and a time offset (TO) parameter associated with said first and second navigation systems, wherein said means for determining said estimated TB include means for generating one or more electronic signals representing said TO parameter based, at least in part, on said differential GD parameter; and
   means for selectively determining a pseudorange (PR) measurement corresponding to said apparatus and at least one space vehicle (SV) of either said first or second navigation systems based, at least in part, on said estimated TB parameter.

16. The apparatus as recited in claim 15, wherein said first navigation system is operatively associated with a first system time and said second navigation system is operatively associated with a second system time that is offset from said first system time by a dynamically changing offset value, wherein said TO parameter is associated with said dynamically changing offset value.

17. The apparatus as recited in claim 16, further comprising:
means for receiving one or more electronic signals representing said TO parameter.

18. The apparatus as recited in claim 15, wherein said differential GD parameter is predetermined.

19. The apparatus as recited in claim 15, further comprising:
means for determining said differential GD parameter based, at least in part, on at least one of a temperature parameter or a previously stored TB parameter.

20. The apparatus as recited in claim 15, further comprising:
means for verifying that said estimated TB parameter is acceptable for use based, at least in part, on at least one uncertainty measurement associated with said estimated TB parameter.

21. The apparatus as recited in claim 15, further comprising:
means for obtaining one or more electronic signals representing a first plurality of SPS signals associated with said first navigation system, wherein a first total number of available SPS signals associated with said first navigation system does not satisfy a minimum number of SPS signals to compute an estimated position of said device; and
means for obtaining one or more electronic signals representing at least one SPS signal associated with said second navigation system, and wherein a second total number of available SPS signals associated with said second navigation system also does not satisfy said minimum number of SPS signals to compute said estimated position of said device, but wherein said first and second total number of available SPS signals summed together does satisfy said minimum number of SPS signals to compute said estimated position of said device.

22. The apparatus as recited in claim 21, wherein said minimum number of SPS signals to compute said estimated position of said device is three provided that an altitude parameter is available, or four otherwise.

23. The apparatus as recited in claim 21, wherein said minimum number of SPS signals to compute said estimated position of said device is four provided that an altitude parameter is available, or five otherwise.

24. The apparatus as recited in claim 15, wherein at least one of said first or second navigation systems comprises a Global Navigation Satellite System (GNSS).

25. The apparatus as recited in claim 15, further comprising means for generating one or more electronic signals for input to a positioning calculation, wherein said one or more electronic signals are based, at least in part, on said PR measurement.

26. The apparatus as recited in claim 15, further comprising means for generating one or more electronic signals to enable said apparatus to determine an estimated position of said apparatus, wherein said one or more electronic signals are based, at least in part, on:
said PR measurement; and
at least three additional stored PR measurements.

27. An apparatus, comprising:
memory having stored therein information associated with a plurality of different satellite positioning system (SPS) signals from a plurality of navigation systems comprising at least first and second navigation systems; and
at least one processing unit operatively coupled to said memory and configured to:
determine an estimated time bias (TB) parameter based, at least in part, on a differential group delay (GD) parameter associated with said apparatus and a time offset (TO) parameter associated with said first and second navigation systems,
determine said TO parameter based, at least in part, on said differential GD parameter, and
selectively determine a pseudorange (PR) measurement corresponding to said apparatus and at least one space vehicle (SV) of either said first or second navigation systems based, at least in part, on said estimated TB parameter.

28. The apparatus as recited in claim 27, wherein said first navigation system is operatively associated with a first system time and said second navigation system is operatively associated with a second system time that is offset from said first system time by a dynamically changing offset value, and wherein said TO parameter is associated with said dynamically changing offset value.

29. The apparatus as recited in claim 28, further comprising:
a receiver operatively coupled to at least one of said memory or said at least one processing unit, wherein said receiver is configured to receive said TO parameter and provide said TO parameter to at least one of said memory or said at least one processing unit.

30. The apparatus as recited in claim 27, wherein said differential GD parameter is predetermined.

31. The apparatus as recited in claim 27, wherein said at least one processing unit is configured to determine said differential GD parameter based, at least in part, on at least one of a temperature parameter or a previously stored TB parameter.

32. The apparatus as recited in claim 27, wherein said at least one processing unit is configured to verify that said estimated TB parameter is acceptable for use based, at least in part, on at least one uncertainty measurement associated with said estimated TB parameter.

33. The apparatus as recited in claim 27, wherein at least a portion of said information stored in said memory is associated with a first plurality of SPS signals associated with said first navigation system, and a first total number of available SPS signals associated with said first navigation system does not satisfy a minimum number of SPS signals to compute an estimated position of said device; and
wherein at least another portion of said information stored in said memory is associated with at least one SPS signal associated with said second navigation system, and a second total number of available SPS signals associated with said second navigation system also does not satisfy said minimum number of SPS signals to compute said estimated position of said device, but wherein said first and second total number of available SPS signals summed together does satisfy said minimum number of SPS signals to compute said estimated position of said device.

34. The apparatus as recited in claim 33, wherein said minimum number of SPS signals to compute said estimated position of said device is three provided that an altitude parameter is available, or four otherwise.

35. The apparatus as recited in claim 33, wherein said minimum number of SPS signals to compute said estimated position of said device is four provided that an altitude parameter is available, or five otherwise.

36. The apparatus as recited in claim 27, wherein at least one of said first or second navigation systems comprises a Global Navigation Satellite System (GNSS).

37. The apparatus as recited in claim 27, wherein said at least one processing unit is configured to generate one or more electronic signals for input to a positioning calculation, wherein said one or more electronic signals are based, at least in part, on said PR measurement.

38. The apparatus as recited in claim 27, wherein said at least one processing unit is configured to generate one or more electronic signals to enable said apparatus to determine an estimated position of said apparatus, and said one or more electronic signals are based, at least in part, on:
said PR measurement; and
at least three additional stored PR measurements.

39. A non-transitory computer-readable medium having computer implementable instructions stored thereon that are configured to cause an electronic device to:
obtain satellite positioning system (SPS) signals associated with at least first and second navigation systems;
determine an estimated time bias (TB) parameter based, at least in part, on a differential group delay (GD) parameter associated with said device and a time offset (TO) parameter associated with said first and second navigation systems, wherein one or more electronic signals representing said TO parameter are generated based, at least in part, on said differential GD parameter; and
selectively determine a pseudorange (PR) measurement corresponding to said electronic device and at least one space vehicle (SV) of either said first or second navigation systems based, at least in part, on said estimated TB parameter.

40. The non-transitory computer-readable medium as recited in claim 39, wherein said first navigation system is operatively associated with a first system time and said second navigation system is operatively associated with a second system time that is offset from said first system time by a dynamically changing offset value, wherein said TO parameter is associated with said dynamically changing offset value.

41. The non-transitory computer-readable medium as recited in claim 40, wherein the computer implementable instructions are configured to cause the electronic device to:
obtain one or more electronic signals representing said TO parameter.

42. The non-transitory computer-readable medium as recited in claim 39, wherein said differential GD parameter is predetermined.

43. The non-transitory computer-readable medium as recited in claim 39, wherein the computer implementable instructions are configured to cause the electronic device further enable the electronic device to:
determine said differential GD parameter based, at least in part, on at least one of a temperature parameter or a previously stored TB parameter.

44. The non-transitory computer-readable medium as recited in claim 39, wherein the computer implementable instructions are configured to cause the electronic device further enable the electronic device to:
verify that said estimated TB parameter is acceptable for use based, at least in part, on at least one uncertainty measurement associated with said estimated TB parameter.

45. The non-transitory computer-readable medium as recited in claim 39, wherein the computer implementable instructions are configured to cause the electronic device further enable the electronic device to:
obtain one or more electronic signals representing a first plurality of SPS signals associated with said first navigation system, wherein a first total number of available SPS signals associated with said first navigation system does not satisfy a minimum number of SPS signals to compute an estimated position of said device; and
obtain one or more electronic signals representing at least one SPS signal associated with said second navigation system, and wherein a second total number of available SPS signals associated with said second navigation system also does not satisfy said minimum number of SPS signals to compute said estimated position of said device, but wherein said first and second total number of available SPS signals summed together does satisfy said minimum number of SPS signals to compute said estimated position of said device.

46. The non-transitory computer-readable medium as recited in claim 45, wherein said minimum number of SPS signals to compute said estimated position of said device is three provided that an altitude parameter is available, or four otherwise.

47. The non-transitory computer-readable medium as recited in claim 45, wherein said minimum number of SPS signals to compute said estimated position of said device is four provided that an altitude parameter is available, or five otherwise.

48. The non-transitory computer-readable medium as recited in claim 39, wherein at least one of said first or second navigation systems comprises a Global Navigation Satellite System (GNSS).

49. The non-transitory computer-readable medium as recited in claim 39, wherein said computer implementable instructions are further configured to cause said electronic device to generate one or more electronic signals for input to a positioning calculation, wherein said one or more electronic signals are based, at least in part, on said PR measurement.

50. The non-transitory computer-readable medium as recited in claim 39, wherein said computer implementable instructions are further configured to cause said electronic device to determine an estimated position of said electronic device, based, at least in part, on:
said PR measurement; and
at least three additional stored PR measurements.

* * * * *